(12) United States Patent
De Dobbelaere et al.

(10) Patent No.: US 9,136,946 B2
(45) Date of Patent: *Sep. 15, 2015

(54) LOW-COST TRANSCEIVER APPROACH

(75) Inventors: Peter De Dobbelaere, San Diego, CA (US); Thierry Pinguet, Vashon, WA (US); Mark Peterson, San Diego, CA (US); Mark Harrison, Escondido, CA (US); Alexander G. Dickinson, Laguna Beach, CA (US); Lawrence C. Gunn, Encinitas, CA (US)

(73) Assignee: Luxtera, Inc., Carlsbad, CA (US)

( * ) Notice: Subject to any disclaimer, the term of this patent is extended or adjusted under 35 U.S.C. 154(b) by 803 days.

This patent is subject to a terminal disclaimer.

(21) Appl. No.: 13/422,635

(22) Filed: Mar. 16, 2012

(65) Prior Publication Data

US 2012/0177380 A1     Jul. 12, 2012

Related U.S. Application Data

(60) Continuation of application No. 13/156,979, filed on Jun. 9, 2011, now Pat. No. 8,165,431, which is a continuation of application No. 12/483,699, filed on Jun. 12, 2009, now Pat. No. 7,961,992, which is a (Continued)

(51) Int. Cl.
*G02B 6/36* (2006.01)
*H04B 10/40* (2013.01)
*G02B 6/42* (2006.01)
*G02B 6/38* (2006.01)

(52) U.S. Cl.
CPC .............. *H04B 10/40* (2013.01); *G02B 6/4214* (2013.01); *G02B 6/4246* (2013.01); *G02B 6/3885* (2013.01)

(58) Field of Classification Search
None
See application file for complete search history.

(56) References Cited

U.S. PATENT DOCUMENTS

| 5,337,398 | A  | * | 8/1994 | Benzoni et al. | 385/90 |
| 7,095,620 | B2 | * | 8/2006 | Bozso et al. | 361/767 |
| 7,251,386 | B1 |   | 7/2007 | Dickinson |  |
| 2003/0215977 | A1 | * | 11/2003 | Trezza et al. | 438/64 |
| 2004/0100781 | A1 | * | 5/2004 | Bozso et al. | 361/767 |

OTHER PUBLICATIONS

Chinese Patent Office, First Office action in Application No. 200880116716.0 dated Feb. 14, 2012, with translation.
European Patent Office, Communication with extended European search report, in Application No. 08837593.6-1524/2201417 PCT/US2008078398, dated Mar. 16, 2012. (8 pages).

(Continued)

*Primary Examiner* — Tina Wong
(74) *Attorney, Agent, or Firm* — McAndrews Held & Malloy

(57) ABSTRACT

A transceiver comprising a plurality of CMOS chips, a first chip comprising optical and optoelectronic devices and at least a second chip comprising electronic devices may be operable to communicate an optical source signal from a semiconductor laser into the first CMOS chip. The optical source signal may be used to generate first optical signals that may be transmitted from the first CMOS chip to optical fibers. Second optical signals may be received from the optical fibers and converted to electrical signals via photodetectors. The optical source signal may be communicated from the semiconductor laser into the CMOS chip via optical fibers in to a top surface and the first optical signals may be communicated out of a top surface of the CMOS chip. The first optical signals may be communicated from the first CMOS chip via optical couplers, which may comprise grating couplers.

50 Claims, 33 Drawing Sheets

Related U.S. Application Data division of application No. 11/611,084, filed on Dec. 14, 2006, now Pat. No. 7,773,836, which is a continuation-in-part of application No. 10/758,561, filed on Jan. 14, 2004, now Pat. No. 7,251,386, and a continuation-in-part of application No. 10/799,040, filed on Mar. 11, 2004, now Pat. No. 7,162,124, and a continuation-in-part of application No. 10/917,204, filed on Aug. 11, 2004, now Pat. No. 7,116,853, and a continuation-in-part of application No. 11/384,019, filed on Mar. 17, 2006, now Pat. No. 7,298,945.

(60) Provisional application No. 60/750,488, filed on Dec. 14, 2005.

(56) References Cited

OTHER PUBLICATIONS

Behnam, Analui et al., "A Fully Integrated 20-Gb/s Optoelectronic Transceiver Implemented in a Standard 0.13-CMOS SOI Technology", IEEE Journal of Solid-State circuits, IEEE Service Center, Piscatway, NJ, USA, vol. 41, No. 12, Dec. 1, 2006, pp. 2945-2955, XP011150709, ISSN: 0018-9200, DOI: 10.1109/JSSC.2006.884388, p. 2945-p. 2948; figures, 2, 4, 14. (12 pages).

Gianlorenzo Masini et al., "High-speed Monolithic CMOS Receivers at 1550nm with Ge on Si Waveguide Photodetectors", Lasers and Electro-Optics Society, 2007, LEOS 2007. The 20th Annual meeting of the IEEE, IEEE, PI, Oct. 1, 2007, pp. 848-849, XP031160848, ISBN: 978-1-4244-0924-2; the whole document. (2 pages).

\* cited by examiner

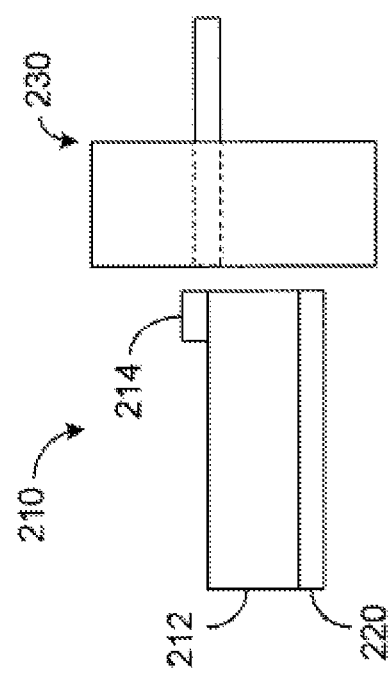

LOW-COST TRANSCEIVER APPROACH

RELATED APPLICATIONS

This application is a continuation of application Ser. No. 13/156,979 filed on Jun. 9, 2011 (reissue application Ser. No. 13/774,808 filed Feb. 22, 2013), which is a continuation of application Ser. No. 12/483,699 filed on Jun. 12, 2009 (reissue application Ser. No. 13/772,155 filed on Feb. 20, 2013), which is a divisional of application Ser. No. 11/611,084 filed Dec. 14, 2006 (reissue application Ser. No. 13/491,968 filed on Jun. 8, 2012), which in turn makes reference to, claims priority to and claims the benefit of: U.S. Provisional Patent Application No. 60/750,488 filed Dec. 14, 2005, and is a continuation-in-part of U.S. patent application Ser. No. 10/758,561 filed Jan. 14, 2004. Said application Ser. No. 11/611,084 is also a continuation-in-part of the following: (1) U.S. patent application Ser. No. 10/758,561 filed on Jan. 14, 2004, now U.S. Pat. No. 7,251,386; (2) U.S. patent application Ser. No. 10/799,040 filed on Mar. 11, 2004, now U.S. Pat. No. 7,162,124; (3) U.S. patent application Ser. No. 10/917,204 filed on Aug. 11, 2004, now U.S. Pat. No. 7,116,853; and (4) U.S. patent application Ser. No. 11/384,019 filed on Mar. 17, 2006, now U.S. Pat. No. 7,298,945.

This application relates to U.S. patent application Ser. No. 11/611,042, titled "INTEGRATED TRANSCEIVER USING EDGE DETECTING PHOTODETECTOR," U.S. patent application Ser. No. 11/611,065, titled "INTEGRATED TRANSCEIVER USING SURFACE DETECTING PHOTODETECTOR," and U.S. patent application Ser. No. 11/611,093, titled "INTEGRATED TRANSCEIVER USING SUBMOUNT," each filed on Dec. 14, 2006.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field

The present disclosure generally relates to optoelectronic devices, and more particularly, to integrated transceivers having emitter and detector incorporated therewith.

2. Description of the Related Art

A transceiver is a device that has both a transmitter and a receiver. Typically, the transmitter and receiver share at least some common circuitry, and sometimes, the same housing.

An optical transceiver is a device that receives and transmits optical signals. The transmitter in the optical transceiver is typically a device such as a laser that modulates light outputs based on electrical input signals. The receiver in the optical transceiver is typically a device such as a photodetector that converts optical input signals into electrical output signals.

Optical transceivers are commonly used in digital data communication applications, such as telecommunication. What is needed are optical transceivers that are fast, provide high bandwidth, and have reduced form factor.

BRIEF SUMMARY OF THE INVENTION

A wide variety of systems, devices, methods, and processes comprising embodiments of the invention are described herein. Systems and methods for configuring an integrated transceiver can include, in one embodiment among others, a very small form factor transceiver that can be configured to allow 10 G optical interconnects over distances up to 2 km. In one embodiment, transceiver circuitry can be integrated on a single die, and be electrically connected to a transmitter such as a laser-diode and a receiver such as a photo-diode. In one embodiment, the laser and photodiodes can be edge-operating, and be mounted on the die. In one embodiment, one or both of the diodes can be surface-operating so as to allow relaxation of alignment requirement. In one embodiment, one or both of the diodes can be mounted on a submount that is separate from the die so as to facilitate separate assembly and testing. In one embodiment, the diodes can be optically coupled to a ferrule via an optical coupling element so as to manage loss in certain situations.

For example, one embodiment of the present disclosure relates to an integrated transceiver that includes a die including a plurality of semiconductor electronic devices. The integrated transceiver further includes an edge detecting photodetector and a semiconductor laser such as an edge emitting semiconductor laser. The plurality of semiconductor electronic devices are electrically coupled to the photodetector and the laser to process optical input received by the photodetector and control optical output produced by the laser. The photodetector may be integrated in the die and may be optically coupled to the fiber via a waveguide and a grating coupler. In this manner, light may be coupled vertically into and out of the surface of the die. The die may comprise a complementary metal oxide semiconductor (CMOS) die, for example, which enables the integration of optical, optoelectronic, and electronic devices on the die.

Another embodiment of the present disclosure relates to an integrated transceiver that includes a die having semiconductor electronics. The integrated transceiver further includes a photodetector mounted on the die. The integrated transceiver further includes a laser also mounted on the die, with the semiconductor electronics electrically coupled to the photodetector and the laser to process optical input received by the photodetector and control optical output produced by the laser. The electronic die, the photodetector, and the laser form an integral unit having a largest dimension that is less than approximately 10 mm×9 mm×4 mm.

Yet another embodiment of the present disclosure relates to an integrated transceiver that includes a die having top and bottom surfaces, with the die including a plurality of semiconductor electronic devices thereon. The integrated transceiver further includes a semiconductor laser mounted to the die, with the laser electrically coupled to at least one of the semiconductor electronic devices on the die to drive the laser. The integrated transceiver further includes a photodetector electrically coupled to at least one of the semiconductor electronic devices on the die to process optical input received by the photodetector. The semiconductor photodetector includes a semiconductor region having an optical input surface for receiving light, with the optical input surface being oriented at an angle with respect to the top surface of the die.

Yet another embodiment of the present disclosure relates to an integrated transceiver that includes at least one die including a plurality of semiconductor electronic devices thereon. The integrated transceiver further includes a semiconductor laser having an optical output region configured to output laser light. The integrated transceiver further includes a photodetector having an optical input region including an input surface configured to receive light to be detected. The photodetector and the semiconductor laser are electrically coupled to the semiconductor electronic devices, and the optical input region of the photodetector and the optical output region of the laser are directed in substantially the same direction and separated by a distance of less than about 1000 microns.

Yet another embodiment of the present disclosure relates to an integrated transceiver that includes at least one die including electronics thereon. The integrated transceiver further includes a semiconductor laser having an optical output region configured to output laser light, with the laser in electrical communication with the electronics. The integrated transceiver further includes a photodetector having an optical input region configured to receive light to be detected, with the photodetector in electrical communication with the electronics. The integrated transceiver further includes a support assembly on which the semiconductor laser and the photodetector are mounted such that the optical output region of the laser and the optical input region of the photodetector are separated by a distance of less than about 1000 microns.

Yet another embodiment of the present disclosure relates to an integrated transceiver that includes at least one die including electronics thereon. The integrated transceiver further includes a semiconductor laser disposed on the at least one die and in electrical communication with the electronics. The integrated transceiver further includes a photodetector disposed on the at least one die and in electrical communication with the electronics. The integrated transceiver further includes a light pipe having a length of substantially optically transmissive material having a first end and a second end, with the second end disposed proximal to the photodetector, the second end having a sloping reflective surface angled such that light propagating along the length from the first end to the second end is redirected to the photodetector.

BRIEF DESCRIPTION OF SEVERAL VIEWS OF THE DRAWINGS

FIGS. 6A-6D show different views of one embodiment of the integrated transceiver, where the photo-diode can be configured for surface-detection of signals;

These and other aspects, advantages, and novel features of the present teachings will become apparent upon reading the following detailed description and upon reference to the accompanying drawings. In the drawings, similar elements have similar reference numerals.

DETAILED DESCRIPTION OF THE INVENTION

Certain embodiments of the present disclosure relates to integrated transceivers. In some embodiments, such transceivers can have small form factors (SFF) or very small form factors (VSFF).

In some embodiments, the SFF or VSFF integrated transceivers can be packaged in a relatively low cost manner and enable 10 G optical interconnects over distances up to 2 km. Such economical packaging can lead to proliferation of 10 G interconnects, and can lead to faster optical interconnects with data rates of 100 G (Gb/s) and higher.

In designing such integrated transceivers, cost can be an important factor. Cost associated with the integrated transceivers can include, for example, component costs, cable and connectorization costs, footprint, and cooling cost. In some embodiments, such design costs can be addressed by packaging the integrated transceiver in a VSFF configuration.

For example, the transceiver's size can be reduced (thus reducing the footprint) significantly by integrating various functionalities of the transceiver on one or more dies. In a typical transceiver, a PCB (printed circuit board) is usually the largest part; thus in one embodiment, the electronic components associated with the PCB can be integrated on a single die. In some embodiments, such integration of electrical components on a die can reduce electrical parasitics associated with various connections in the PCB, and thereby improve high speed performance of the transceiver.

Typically, the second largest parts in a transceiver are transmitter optical sub-assembly (TOSA) and receiver optical sub-assembly (ROSA). Thus in one embodiment, various functionalities of TOSA and ROSA can be consolidated so as to reduce the size of the transmitter.

In one embodiment, the transceiver can also be made to be less expensive by consolidating all or substantially all of the electronic components on a single die. Such integration can reduce the number of optical alignments. Moreover, integration of the various components can provide features such as elimination of at least two laser welding steps (one for ROSA and one for TOSA), elimination of a need for pigtailed devices, and/or improved heat sinking of laser and die.

Figure 1:
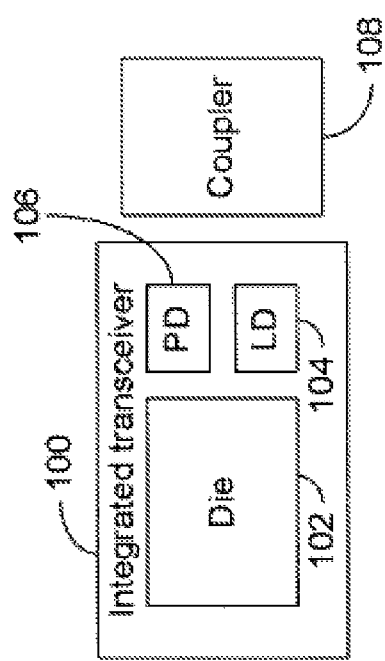
FIG. 1 shows a block diagram of one embodiment of an integrated transceiver that includes a die, a photo-detector such as a photo-diode, and an emitter such as a laser-diode.

FIG. 1 shows a block diagram of one embodiment of an integrated transceiver 100 that includes a die 102, an emitter 104 such as a laser-diode, and a photodetector 106 such as a photo-diode. In one embodiment, the integrated transceiver 100 can have a single die. In one embodiment, the integrated transceiver 100 can have two dies. In one embodiment, the integrated transceiver 100 can have more than two dies.

As further shown in FIG. 1, the integrated transceiver 100 can be configured to facilitate optical coupling with a coupler 108. In one embodiment, the coupler 108 can be a multi-fiber assembly. In one embodiment, the multi-fiber assembly can include an assembly that holds two or more fibers. In one embodiment, the multi-fiber assembly can include injection molded plastic with holes dimensioned to hold fiber ends or stubs. In one embodiment, the multi-fiber assembly can be a device that conforms to an industry standard. For example, the multi-fiber assembly can be any one of mini-MT or MT type connectors.

Figure 2:
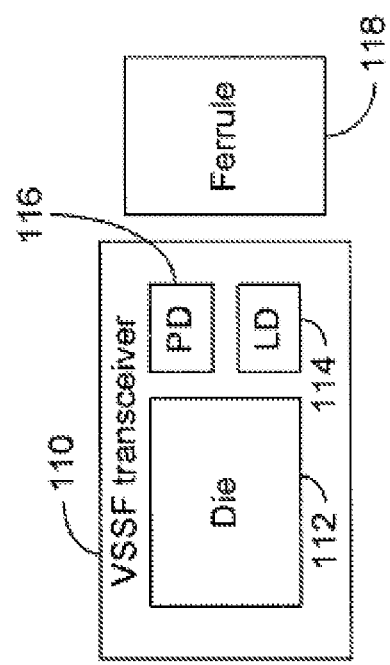
FIG. 2 shows that in one embodiment, the integrated transceiver of FIG. 1 can have a very small form factor (VSSF)

FIG. 2 shows that in one embodiment, the integrated transceiver 100 of FIG. 1 can be a configured to be a VSFF transceiver 110. Accordingly, a die 112, a laser-diode 114, and a photo-diode 116 can be configured to conform to the VSFF configuration, and to allow optical coupling with a ferrule 118.

Figure 3:
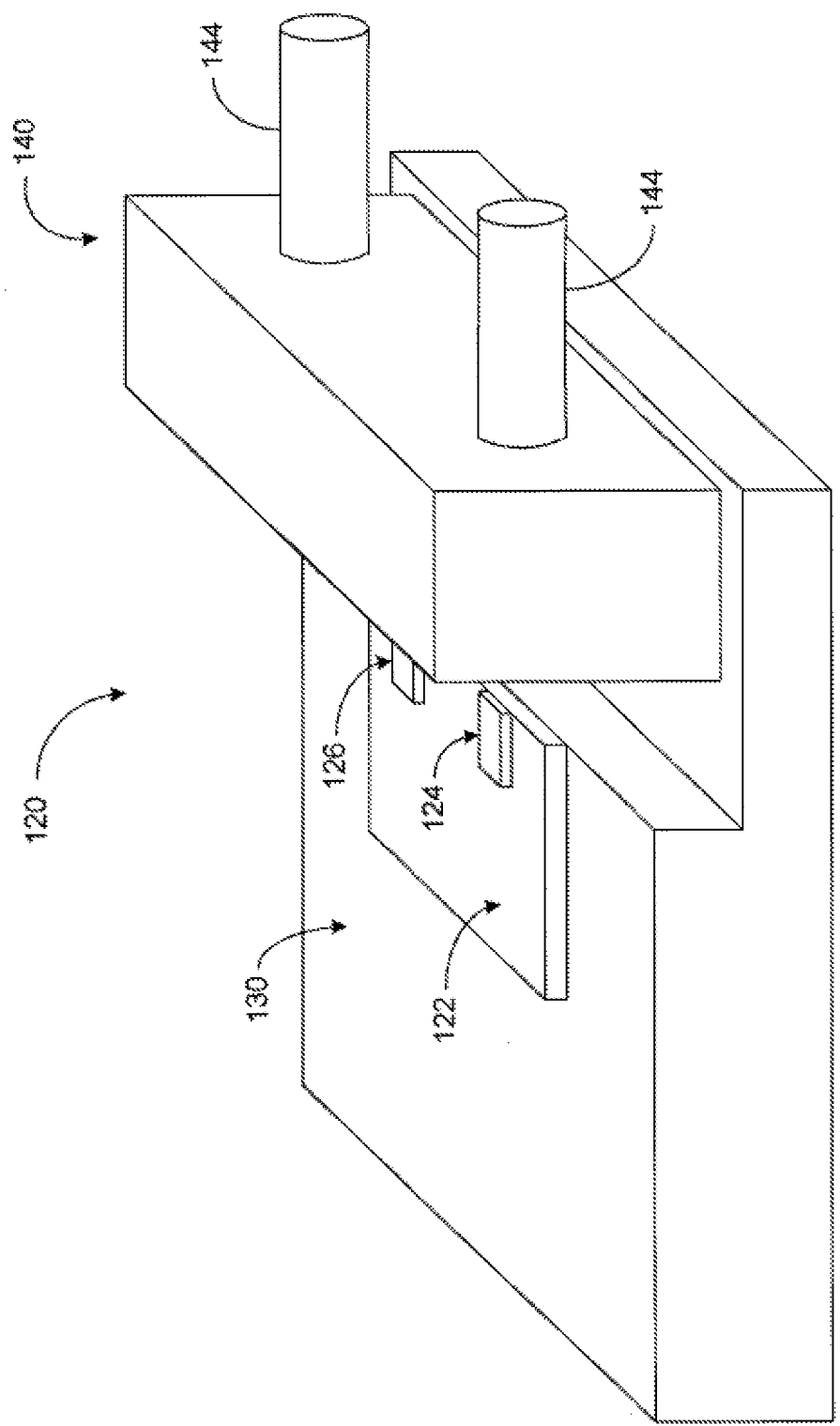
FIG. 3 shows a perspective view of one embodiment of the integrated transceiver of FIG. 1.

FIG. 3 shows a perspective view of one embodiment of an integrated transceiver assembly 120 having a die 122 mounted to a packaging substrate 130. In one embodiment, the substrate 130 can be formed from ceramic. In one embodiment, the substrate 130 can be dimensioned to facilitate positioning of a ferrule 140. The ferrule 140 can include input and output optical fibers 144 that terminate at a housing so as to allow optical coupling with transmitter and/or receiver components.

As further shown in FIG. 3, the integrated transceiver assembly 120 also includes transmitter and receiver components (124 and 126) that can be mounted to or about the die 122. Various transceiver and receiver placement configurations are described below in greater detail.

In some embodiments, the die can include a plurality of semiconductor electronic devices. In one embodiment, such semiconductor electronic devices can include a laser driver and a transimpedance amplifier to facilitate operation of laser and photodiode. In one embodiment, the die includes a semiconductor (for example, silicon) substrate or a substrate having semiconductor disposed thereon.

In one embodiment, the die can have top and bottom surfaces, and a plurality of sides thereabout. The die can be mounted on a packaging substrate (such as the substrate 130 in FIG. 3) so that the bottom surface of the die is mounted to the packaging substrate, either directly or via one or more intervening layers. The top surface of the die can be configured to allow mounting of the laser and/or photodiode, and/or connections for such diode.

In one embodiment, each of the plurality of sides can define an edge. In one embodiment, such an edge can facilitate mounting and operation of edge-emitter and/or edge-detector.

An edge detecting photodetector may for example comprise a multilayer structure having a top and a bottom and side surfaces. The bottom of the multilayer structure may be disposed on the top surface of the die. The multilayer structure may comprise a plurality of layers stacked on top of each other. In some embodiments, the layers form a planar waveguide. Light may be coupled into the side of the edge detecting photodiode. In particular, the waveguide has an input and is optically coupled to a photosensitive region of the detector. Light is introduced into the optical input of the optical waveguide and is guided to the photosensitive region that converts the optical signal into an electrical signal. One example of such a device is a commercially available 40G edge detection photo-diode available from Archcom Technology, Inc., of Azusa, Calif. Other configurations are also possible. For example, light may be coupled into the top surface of the die via a grating coupler.

Figure 4A:
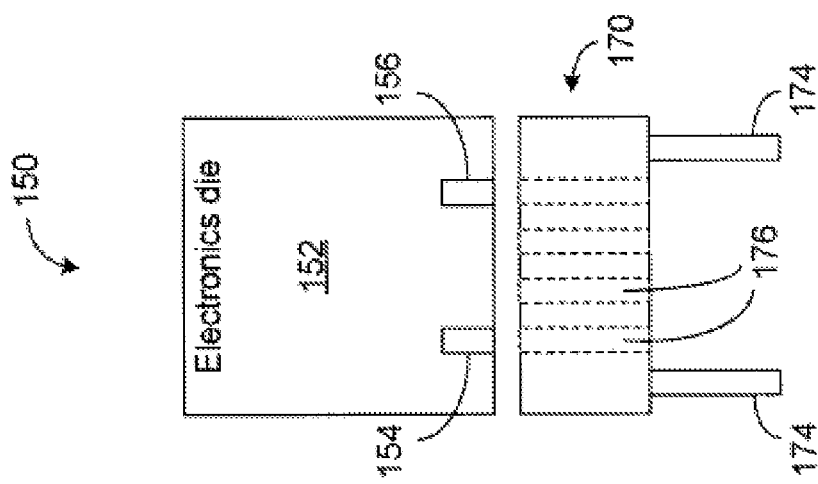
FIGS. 4A-4C show different views of one embodiment of the integrated transceiver, where the photo-diode and the laser-diode can be configured for edge-detecting and edge-emitting of signals, respectively.
Figure 4B:
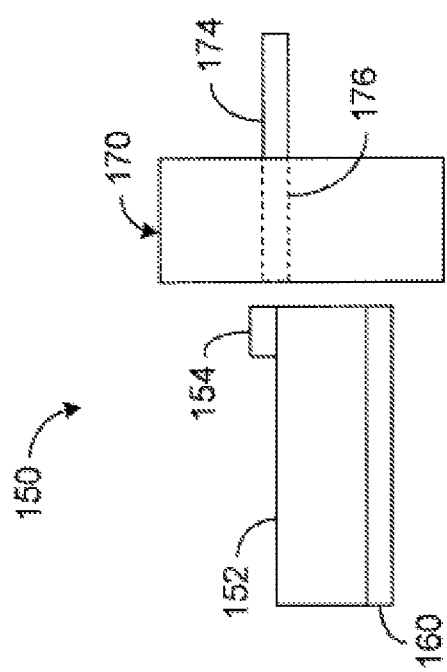
Figure 4C:
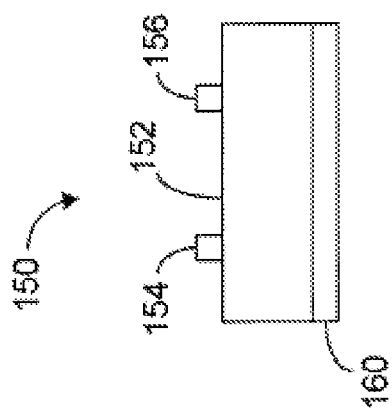

FIGS. 4A-4C show different views (top, side, and front views, respectively) of one embodiment of an integrated transceiver assembly 150, where a laser-diode 154 and a photo-diode 156 can be configured to provide at least one of edge-emitting and edge-detecting functionalities. Accordingly, at least one of the laser and photodiode 154 and 156 can be mounted on the die 152 at or near one of the edges.

In one embodiment, the photo-diode 156 can be an edge-detecting type, and be mounted at or proximal to the edge of the die 152. In one embodiment, both of the photo and laser diodes can be edge-operating type, and be mounted at or proximal to the edge of the die 152. In one embodiment, each of the photo and laser diodes 154 and 156 are positioned on the die 152 so that their active edges are within at least about 10 μm from the edge of the die 152. Other edge-positioning configurations are possible.

In one embodiment, the laser and photodiode 154 and 156 can be spaced at a selected distance so as to allow optical coupling with selected fiber ends 176 of a ferrule assembly 170. Mini-MT multi-fiber assembly is an example of such a ferrule assembly 170. In one embodiment, the ferrule assembly 170 can include a plurality of fiber ends that are optically coupled to input and output optical paths 174. In one such ferrule assembly, the fiber ends are spaced at approximately 250 μm. Thus, in the example shown in FIG. 4A-4C, the laser and photo diode 154 and 156 are spaced apart at about 750 μm. Other spacing configurations are possible. For example, multiple laser diodes 154 and/or multiple photodiodes may be included on the die as discussed below. Such laser diodes 154 and/or photodiodes may be positioned to optically couple to different fibers in the ferrule.

In one embodiment, the edge-detecting photo-diode 156 includes a multi-layer structure having top, bottom, and side surfaces. The bottom surface can be disposed on the top surface of the die 152, either directly or via one or more intervening layers. In one embodiment, a metal layer is disposed between the multi-layer structure of the photo-diode 156 and the top surface of the die 152. In one embodiment, the multi-layer structure includes a waveguide that receives an optical input. The multi-layer also includes a photosensitive region that converts the optical input into an electrical signal. In certain embodiments the photosensitive region forms part of the waveguide.

In one embodiment, the edge-detecting photo-diode 156 can be device comprising a 111-V semiconductor material. As a non-limiting example, the edge-detecting photo-diode 156 may comprise an InGaAs type device. Such a device can be appropriate for use with, for example 1550 nm light. One example of such a device is a commercially available 40G edge detection photo-diode available from Archcom Technology, Inc., of Azusa, Calif. In one embodiment, the edge-detecting photo-diode 156 can be a germanium device. In one embodiment, AlGaAs or Si based photo-diodes can also be used.

In one embodiment, the laser diode 154 can be an edge-emitting semiconductor laser. An example of such semiconductor laser can include devices having III-V semiconductor material. In one embodiment, the semiconductor laser can be flip-chip bonded to the die.

In one embodiment, the foregoing example semiconductor laser 154 can have an optical output region configured to output laser light. In one embodiment, the above-described edge-detecting photo-diode 156 can include an optical input region configured to receive light to be detected. In one embodiment, the optical output region of the laser-diode 154 and the optical input region of the photo-diode 156 are separated by a distance that is less than about 1,000 μm. Other separation configurations are possible.

In one embodiment, the optical output region of the laser-diode 154 and the optical input region of the photo-diode 156 are within about 10 μm of being on the same plane above and parallel the upper surface of the die 152. In one embodiment, the optical output region of the laser-diode 154 and the optical input region of the photo-diode 156 are substantially coplanar. Other elevation configurations are possible.

In one embodiment, the separation and elevation configurations can be in terms of distances with respect to geometric centers of the laser and photo diodes. In one embodiment, such distances can be with respect to an intensity centroids associated with the diodes. Combinations of the above two example conventions, as well as other conventions, are possible.

In some embodiments, the optical axes of the fiber ends 176 can be positioned so as to be substantially aligned with optical axes of the laser-diode 154 and photo-diode 156. In the example configuration shown in FIG. 4B, the fiber ends 176 are depicted as being substantially aligned with the lower active surface of the laser-diode 154. If the active surface was on the upper side of the diodes, or anywhere else on the diodes, the fiber ends 176 can be positioned accordingly.

In one embodiment, at least some of the plurality of semiconductor electronic devices of the die 152 can be electrically coupled to the laser-diode 154 and the photo-diode 156, and be configured to control optical output produced by the laser-diode 154 and process optical input received by the photo-diode 156. In one embodiment, an assembly of such a die 152, laser-diode 154, and photo-diode 156 has a dimension that is less than approximately 10 mm (length)×9 mm (width)×4 mm (thickness). In one embodiment, the assembly of the die 152, laser-diode 154, and photo-diode 156 form an integral unit having a largest dimension that is less than approximately 10 mm. Other dimensions are possible.

In one embodiment, as shown in FIGS. 4B and 4C, the die 152 can be mounted to the packaging substrate (for example, 130 in FIG. 3) via an adhesive layer 160. In one embodiment, the adhesive can be selected based on its thermal conductivity property. For example, an adhesive that has a relatively good thermal conducting property can be selected to reduce thermal resistance between the die 152 and the packaging substrate. Other attachment configurations are possible.

In one embodiment, various functionalities described in FIGS. 4A-4C can be implemented in more than one die. In such a configuration, the plurality of dies can be packaged on a multi-chip module (MOM) to provide substantially similar functionalities.

In one embodiment, the integrated transceiver can be configured to have more than one transmitter, and correspondingly more than one receiver. As shown in FIG. 4A, the ferrule assembly 170 can house more than two fiber ends 176. The example ferrule 170 is depicted as having four fiber ends. Thus, the integrated transceiver 150 can have a second laser-diode (not shown) mounted on the die 152, and a second photo-diode (not shown) mounted on the die 152 so as to provide two-channel functionality.

In one embodiment, as described above, spacing between the fiber ends can be approximately 250 μm. Thus, the example four components (two lasers and two photo-diodes) can be arranged with approximately 250 μm spacing intervals, such that the two outer-most components are separated by approximately 750 μm.

Figure 5A:
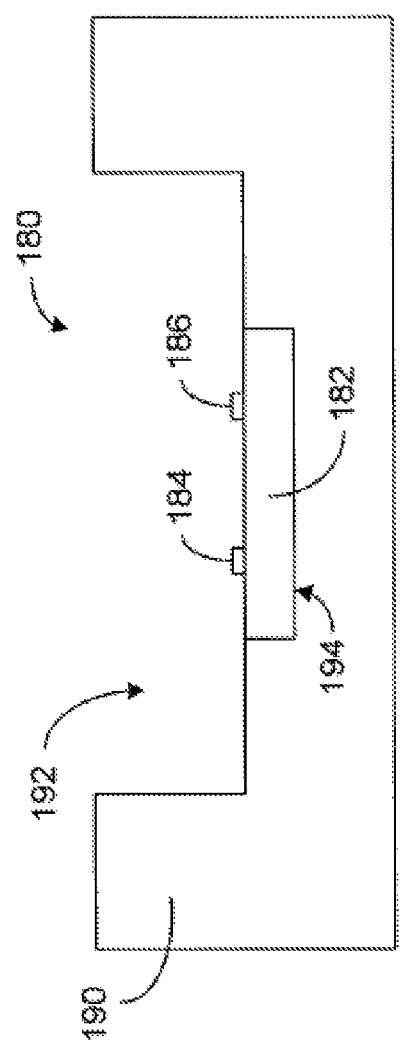
FIGS. 5A and 5B show different views of one embodiment of a packaged assembly having the die-mounted edge-detecting/emitting diodes so as to facilitate optical coupling with a coupler such as a multi-fiber assembly.
Figure 5B:
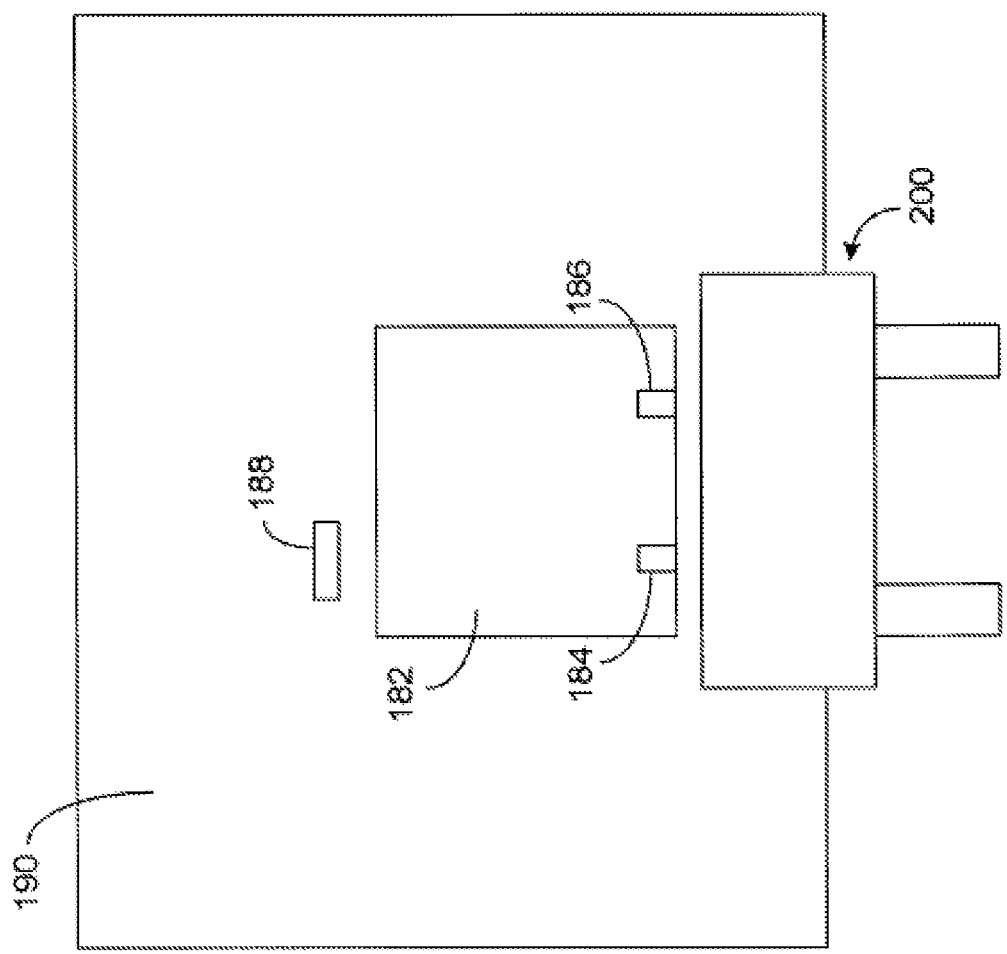

FIG. 5A shows a front sectional view of one embodiment of a packaged edge-operating integrated transceiver 180. FIG. 5B shows a top view of the packaged transceiver 180. As shown, the packaged transceiver 180 can includes a packaging substrate 190 that defines a first recess 194 dimensioned to allow mounting of a die 182. The example die 182 is shown to have mounted on it an edge-emitting laser-diode 184 and an edge-detecting photo-diode 186. In one embodiment, the die 182, laser-diode 184, and photo-diode 186 assembly can be similar to that described above in reference to FIGS. 4A-4C.

In one embodiment, as shown in FIG. 5A, the packaging substrate 190 can also define a second recess 192 that allows access to the mounted die 182 (or access to the first recess for mounting the die 182), and/or to provide protection of the die/laser/photo-diode assembly. As described above in reference to FIG. 3, the packaging substrate (130 in FIG. 3) does not necessarily need to have a recess for mounting of the die (122). Thus, it will be understood that any number of die/substrate mounting configurations are possible.

In one embodiment, as shown in FIG. 5B, the packaging substrate 190 can also be configured to allow mounting of a monitor photo-detector (MPD) 188. The MPD 188 can be configured to monitor the output of the laser 184.

In one embodiment, as shown in FIG. 5B, the packaging substrate 190 can be dimensioned to allow positioning of a ferrule assembly 200. Such dimensioning can include one or more recesses or features that allow positioning of the fiber ends (not shown) at desired locations relative to the optical output and input regions of the laser-diode 184 and photo-diode 186.

FIGS. 6A-6D show various views (top, first side, second side, and front views, respectively) of one embodiment of a transceiver assembly 210, where at least one of the transmitter and receiver is a surface-operating device. For the purpose of description, a photo-diode 216 is depicted as being a surface-detecting device and a laser-diode 214 is depicted as an edge-emitting device. However, it will be understood that in one embodiment, the photo-diode can be edge-detecting, and the laser-diode can be surface-emitting.

In one embodiment, the edge-emitting laser-diode 214 can be mounted to a die 212, and the surface-detecting photo-diode 216 can be mounted to a mounting sub-assembly 218. In one embodiment, the die 212 can include a plurality of semiconductor electronic devices. At least some of those devices can be electrically coupled to the laser-diode 214 mounted on the die 212, and to the photo-diode 216 (wire lead coupling depicted as 222); and be configured to control optical output produced by the laser-diode 214 and process optical input received by the photo-diode 216.

In one embodiment, the structure and configuration of the die 212 can be similar to that described above in reference to FIGS. 4A-4C.

In one embodiment, the example laser-diode 214 can be configured and mounted to the die 212 in a manner similar to the laser-diode 154 described above in reference to FIGS. 4A-4C.

In one embodiment, a photo-diode 216 that is mountable on the mounting sub-assembly 218 can be a standardized component. For example, photo-diode products from companies such as Kyocera can be mounted to the sub-assembly 218. Similarly, laser-diode products from companies such as Kyocera can also be mounted to a sub-assembly.

In one embodiment, the some or all of the mounting sub-assembly 218 can be formed from ceramic. The ceramic support structure can include one or more pathways for facilitating electrical connections between the photo-diode 216 and the die.

In one embodiment, a support structure (such as ceramic structure) that supports the die 212 can be the part of the same structure that supports the photo-detector 216. In another embodiment, the support structure for the die 212 is not part of the structure that supports the photo-detector 216. These two separate structures may or may not be coupled mechanically.

In one embodiment, the photo-detector 216 can be a semiconductor photo-detector that includes a semiconductor region having an optical input surface 224 for receiving light. The optical input surface can be oriented at an angle with respect to the top surface of the die 212.

In one embodiment, the photo-detector 216 can include a plurality of electrical leads that extend away from the detecting surface (rearward if the detecting surface faces front). The plurality of electrical leads contact the semiconductor region through bonds on a rearward side of the semiconductor region (on the side opposite to the fiber). The bonds and leads extending from the photo-detector may in some embodiments have a thickness that would otherwise prevent the fiber from being brought sufficiently close to the detecting surface of the photo-detector if the lead were on the front side of photodetector. Accordingly, the bonds may be on the rear side of the photo-detector with the fiber on the front side of the detector. In one embodiment, a packaging of the photo-detector 216 can include an optically transmissive panel forward of the semiconductor region that transmits light to the semiconductor region. For example, the photodiode may comprise semiconductor having a photosensitive detecting surface mounted downward onto a package with an optically transmissive aperture that permits light to pass through the package to the photosensitive detector surface of the semiconductor. The opposite side of the semiconductor may include the electrical leads to provide access for the fiber.

In one embodiment, the semiconductor region of the photo-detector 216 can be a semiconductor diode. In one embodiment, the optical input surface of the semiconductor region can be substantially planar. In one embodiment, the optical input surface can be oriented substantially orthogonal to the top surface of the die.

In one embodiment, the laser 214 has an output face. The optical input surface of the photo-detector 216 and the output face of the laser 214 are directed substantially in the same direction. In one embodiment, the optical input surface of the semiconductor region of the photo-detector 216 and the output face of the laser 214 are coplanar.

In one embodiment, the output face of the laser 214 and the optical input surface of the photo-detector 216 can be within about 1 to 6 degrees, and within about 60 microns (μm) of being coplanar. In one embodiment, the output face of the laser 214 and the optical input surface of the photo-detector 216 are tilted with respect to each other by about 4 to 10 degrees. The photo-detector may be tilted, for example, to reduce light reflected back into the fiber.

In one embodiment, the laser and photo diodes 214 and 216 can be spaced at a selected distance so as to allow optical coupling with selected fiber ends of a ferrule assembly 230. In one embodiment, the ferrule assembly 230, and the selected spacing between the diodes, can be similar to the ferrule 170 described above in reference to FIGS. 4A-4C. For example, the output face of the laser 214 and the optical input surface of the photo-detector 216 can be laterally separated from each other, as measured center-to-center, by about 750 microns for optical interconnection with the selected fibers in the ferrule 230. In different embodiments, the center-to-center distance may be larger or smaller than 750 microns. In certain embodiments, however, the center-to-center distance is less than 1000 microns. In one embodiment, the center-to-center distance may be less than 750 microns (for example, about 250 microns).

In one embodiment, an assembly of such a die 212, laser-diode 214, and photo-diode 216 can have dimensions that are similar to the assembly described above in reference to FIGS. 4A-4C. In one embodiment, the assembly of the die 212, laser-diode 214, and photo-diode 216 form an integral unit having a largest dimension that is less than approximately 15 mm. Other dimensions are possible.

Figure 6A:
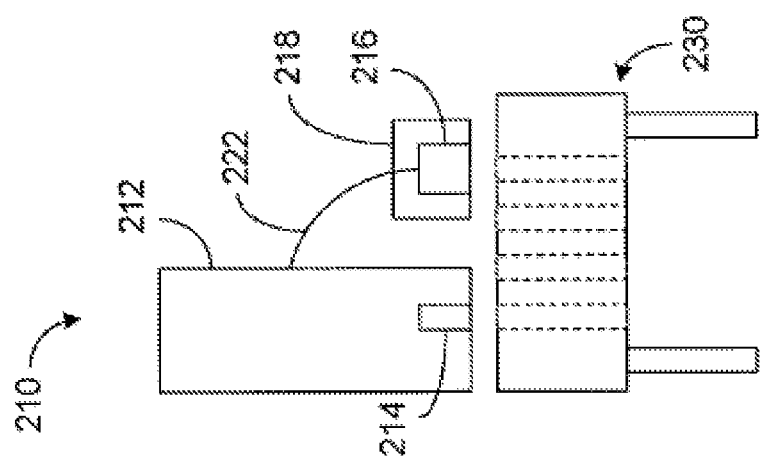
Figure 6C:
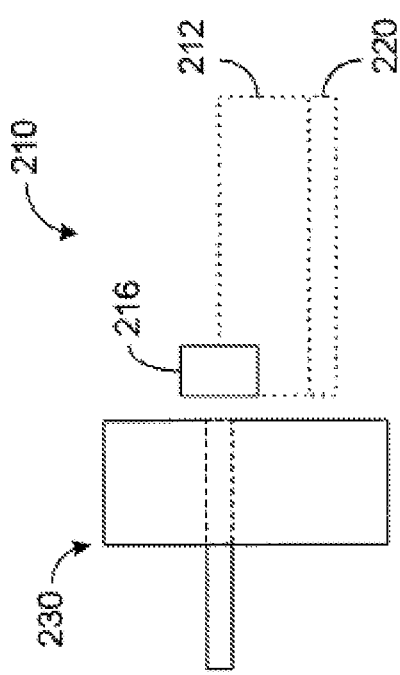
Figure 6D:
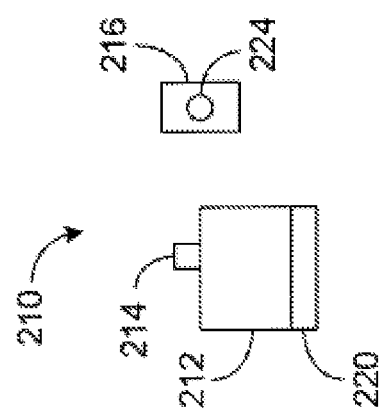

In one embodiment, as shown in FIGS. 6B-6D, the die 212 can be mounted to the packaging substrate (for example, 130 in FIG. 3) via an adhesive layer 220. Other attachment configurations are possible.

In one embodiment, various functionalities described in FIGS. 6A-6D can be implemented in more than one die. In such a configuration, the plurality of dies can be packaged on a multi-chip module (MOM) to provide substantially similar functionalities.

In one embodiment, use of the surface-operating component (such as the surface-detecting photo-detector 216) can allow use of standard parts, as well as providing a more relaxed alignment requirement for the surface-operating component. In one embodiment, however, such features can be offset by size limitations that can be imposed by the surface-operating component. For example, use of certain standard surface-detecting photo-detectors may limit the integrated transceiver to a single channel device if coupled to certain type of Mini-MT multi-fiber assembly.

Figure 7A:
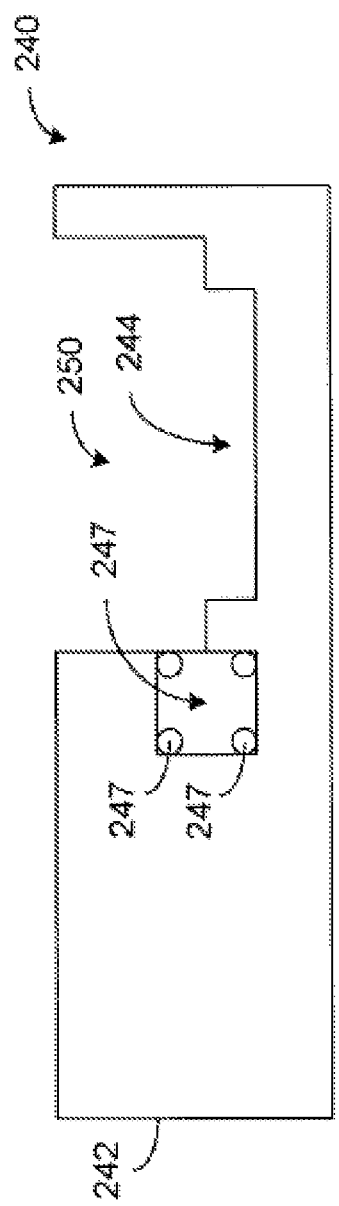
FIG. 7A shows one embodiment of a package configured to allow mounting of a die and a surface-detecting photo-diode.

FIG. 7A shows a front sectional view of one embodiment of a packaging assembly 240 that can be dimensioned to receive an integrated transceiver similar to that described above in reference to FIGS. 4A-4D. In one embodiment, a packaging substrate 242 can define a first recess 244 dimensioned to receive a die (for example, the die 212 of FIGS. 6A-6D). In one embodiment, the first recess 244 can be formed within a second larger recess 250 that allows access to the first recess 244 for mounting of the die, or for accessing the mounted die, and/or to provide protection of the die. As described above in reference to FIG. 3, the packaging substrate (130 in FIG. 3) does not necessarily need to have a recess for mounting of the die. Thus, it will be understood that any number of die/substrate mounting configurations are possible.

In one embodiment, as shown in FIG. 7A, the packaging substrate 242 can define a receptacle opening 246 dimensioned to receive a surface-operating component (for example, the surface-detecting photo-detector 216 of FIGS. 6A-6D). The packaging substrate 242 can further define one or more pathways 247 dimensioned to facilitate routing of wires that electrically couple the die with the photo-detector 216.

Figure 7B:
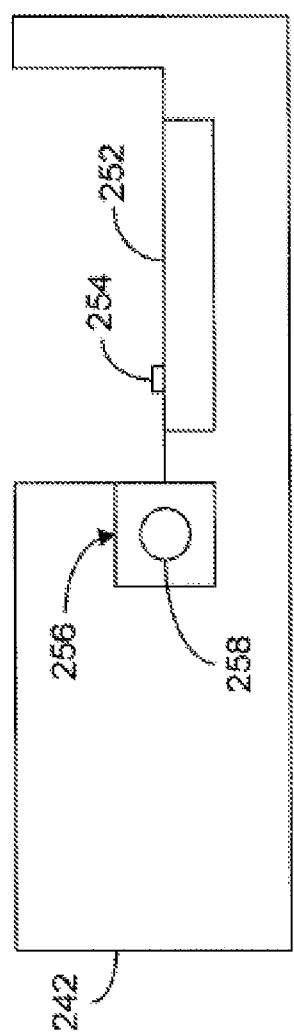
FIGS. 7B and 7C show different views of the package of FIG. 7A with the die and the surface-detecting photo-diode mounted so as to facilitate optical coupling with the multi-fiber assembly.

FIG. 7B shows a similar view as FIG. 7A, but with a die 252 and a surface-detecting photo-detector 256 mounted in their respective openings (244 and 246). An edge-emitting laser 254 can be mounted on the die 252 in a manner described above in reference to FIGS. 6A-6D. Moreover, the first recess 244 and the receptacle opening 246 can be positioned relative to each other such that the laser 254 and the detecting surface 258 of the photo-detector 256 can be positioned at a desired orientation (desired center-to-center spacing, for example).

In some embodiments, the packaging substrate 242 is a monolithic structure to which the photo-detector 216 as well as the die 252 are mounted, with the laser 254 being mounted to the die 252. Other configurations, however, are possible.

Figure 7C:
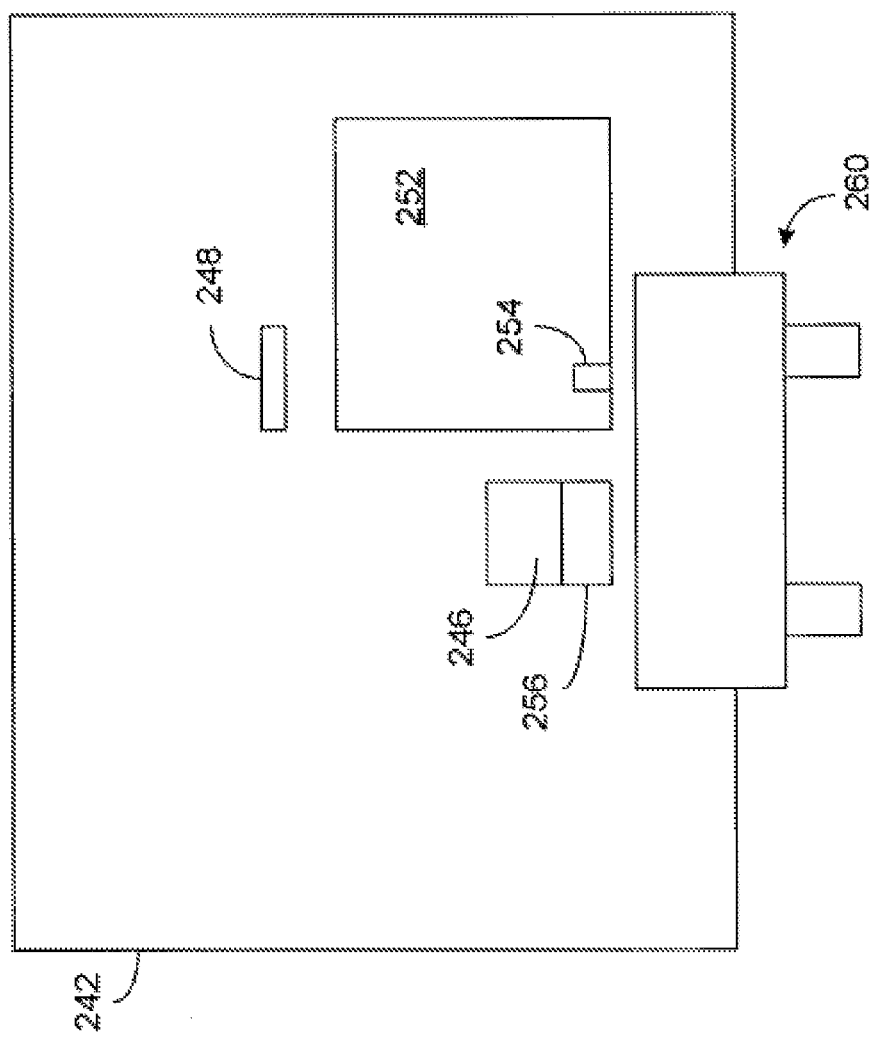

FIG. 7C shows a top view of the packaged assembly of FIG. 7B. In one embodiment, the packaging substrate 242 can be dimensioned to allow positioning of a ferrule assembly 260. Such dimensioning can include one or more recesses or features that allow positioning of the fiber ends (not shown) at desired locations relative to the optical output and input regions of the laser 254 and photo-detector 256.

In one embodiment, as shown in FIG. 7C, the packaging substrate 242 can also be configured to allow mounting of a monitor photo-detector (MPD) 248. The MPD 248 can be configured to monitor the output of the laser 254.

Figure 8A:
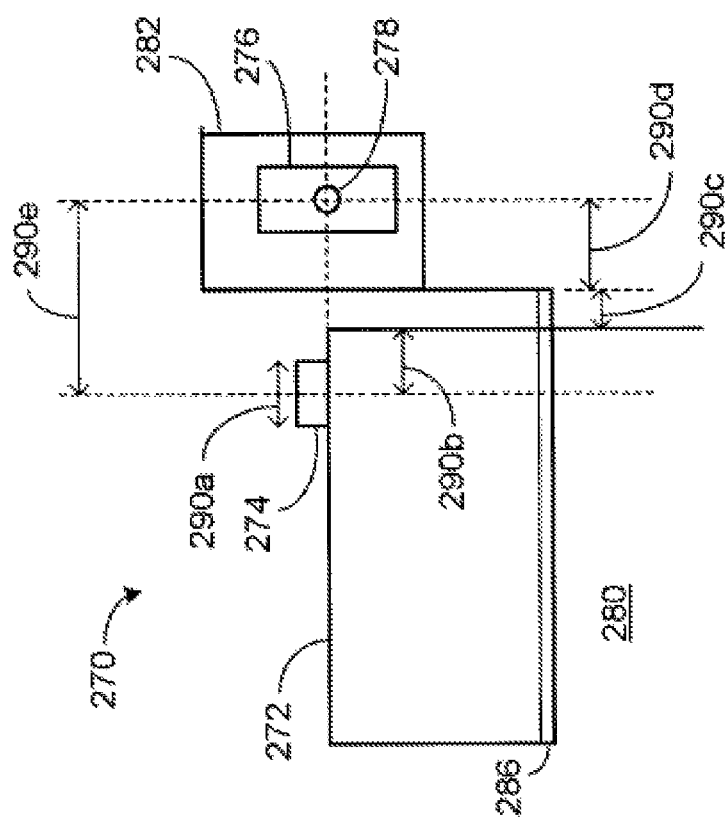
FIGS. 8A and 8B show example geometric design considerations for placement of various components of the integrated transceiver.
Figure 8B:
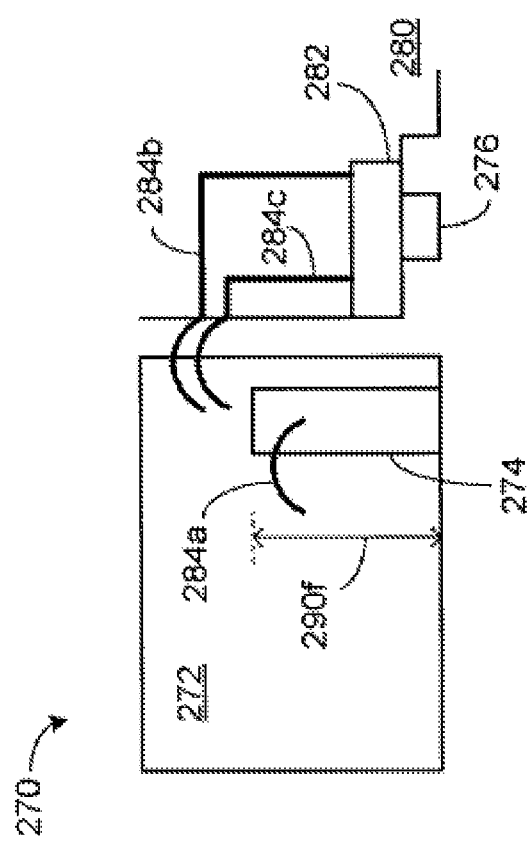

FIGS. 8A and 8B show one embodiment of an integrated transceiver 270 having a surface-detecting photo-detector, where certain geometric parameters can be considered. FIG. 8A shows a front view of the transceiver 270, and FIG. 8B shows a top view.

In FIG. 8A, a die 272 is shown to be mounted on a packaging substrate 280. In one embodiment, the substrate 280 can be formed from ceramic material. In one embodiment, the die 272 can be mounted on the substrate 280 via a die attach layer 286 such as an adhesive layer. An edge-emitting laser 274 is shown to be mounted on the die 272. A surface-detecting photo-detector 276 (having a detecting surface 278) is shown to be mounted to the packaging substrate 280 via a mounting sub-assembly 282. In one embodiment, the die 272, laser 274, and photo-detector 276 can be similar to those described above in reference to FIGS. 6 and 7.

In one embodiment, as shown in FIG. 8B, the photo-detector 276 can be electrically interconnected with the die 272 via connection lines 284$b$ and 284$c$. These connection lines 284$b$ and 284$c$ extend through the sub-assembly 282 to which the photo-detector 282 is mounted as well as through the portion of the package substrate 280 to which the sub-assembly 282 is mounted. In this embodiment the package substrate 280 is shaped to accommodate mounting of both the die 272 and the sub-assembly 282. In one embodiment, the laser 274 can be electrically interconnected with the die 272 via one or more connection lines 284$a$. Other configuration, however, are possible.

In one embodiment, the center of the laser 274 can be positioned at a selected distance from the lateral edge of the die 272 (arrow 290$b$). In one embodiment, the selected distance 290$b$ can be approximately 250 µm. The edge of the die 272 can be positioned at a selected distance from the edge of the mounting sub-assembly 282 (arrow 290$c$). In one embodiment, the selected distance 290$c$ can be approximately 150 µm. The center of the detecting surface 278 of the photo-detector 276 can be positioned at a selected distance from the lateral edge of the mounting sub-assembly 282 (arrow 290$d$). In one embodiment, the selected distance 290$d$ can be approximately 350 µm. Based on the foregoing example configuration, the distance from the center of the laser 274 and the center of the photo-detector 276 (arrow 290$e$) can be approximately 750 µm.

In one embodiment, the lateral width of the laser 274 (arrow 290$a$) can be approximately 250 µm, and the length (arrow 290$f$) can be approximately 750 µm.

As previously described, the example 750 spacing between the laser and the photo-detector can facilitate optical coupling with certain ferrules, such as the Mini-MT multi-fiber assembly. It will be understood that other spacing configurations are also possible. Accordingly, the center-to-center distance may be larger or smaller than 750 microns. In certain embodiments, however, the center-to-center distance is less than 1000 microns.

FIGS. 9A-9D show various views (top, first side, second side, and front views, respectively) of one embodiment 300, where both transmitter 304 and receiver 306 are mounted on a submount 310. In one embodiment, the submount 310 can be a single structure dimensioned to allow mounting of the transmitter 304 and receiver 306. In one embodiment, the submount 310 can be formed by first and second structures 314 and 316 that are joined together. The first structure 314 can be dimensioned to allow mounting of the transmitter 304, and the second structure 316 can be dimensioned to allow mounting of the receiver 306.

In one embodiment, the laser 304 and the photo-detector 306 can be electrically coupled to a die via a plurality of electrical interconnects 312. The electrical interconnects can include, for examples, pins, sockets, wires, traces, conductive pathways imbedded in ridged insulating material, or any combination thereof. Such interconnects can be used to provide electrical connection in other embodiments describe herein as well.

The submount assembly 310 can thus be populated with one or more lasers and one or more photo-detectors separate from die-mounting operations. For example, such populating of the submount assembly 310 can be performed without being impacted by die attaching adhesive thickness variations. Because both the laser and the photo-diode are mounted on the same assembly substantially free from such variations, the laser and photo-diode can be more accurately placed relative to each other.

Moreover, the use of submount for both transmitter and receiver can allow for separate assembly and testing of the optical subassembly prior to connecting it to the die 302.

In one embodiment, such as the example shown in FIGS. 9A-9D, the laser 304 can be an edge-emitting type, and the photo-detector 306 can be a surface-detecting type (with a detecting surface 308). The example laser 304 and the photo-detector 306 can be similar in configuration and relative orientation to those described above in reference to FIGS. 6 and 8. For example, the surface detecting photo-detector 344 may comprise a planar photosensitive surface shown in FIG. 9D that receives the light. In the embodiment shown, this planar photosensitive surface is orthogonal to the top surface of the die 302. Other combinations of laser and photo-detector types mounted on the subassembly 310 are possible. Moreover, the die 302 can be configured in a manner similar to those described above.

Figure 9A:
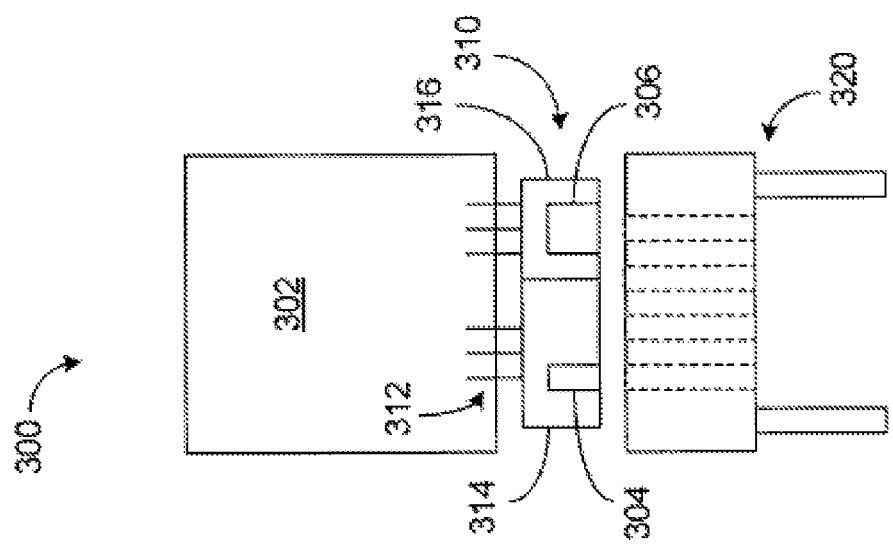
FIGS. 9A-9D shows different views of one embodiment of the integrated transceiver, where the photo-diode and the laser-diode can be mounted on a submount and electrically coupled to the die.
Figure 9B:
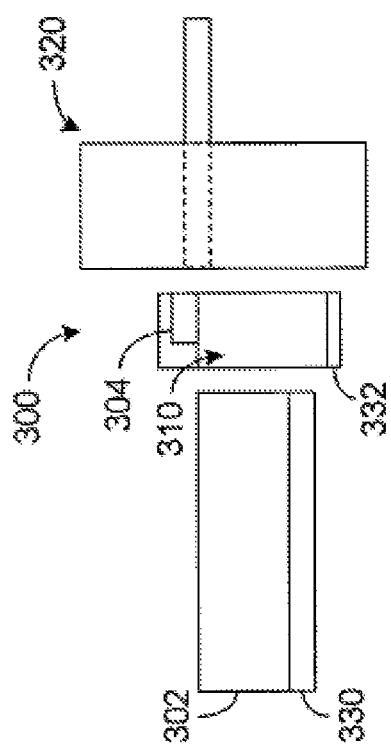
Figure 9C:
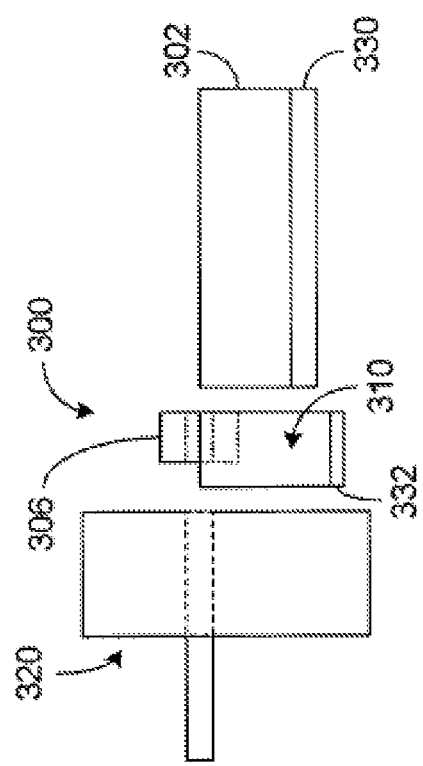
Figure 9D:
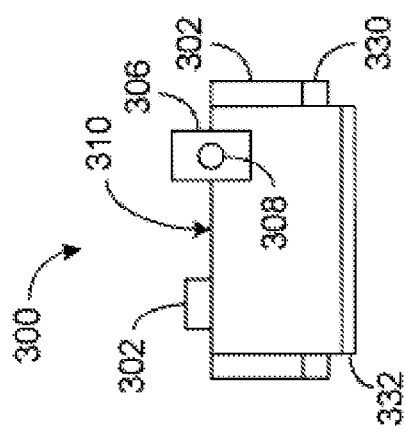

In one embodiment, as shown in FIGS. 9B-9D, the die 302 can be mounted to a packaging substrate (not shown) via an attachment layer 330 such as an adhesive layer. Similarly, the subassembly 310 can be mounted to a packaging substrate (not shown) via an attachment layer 332 such as an adhesive layer. The packaging substrate for the die 302 may or may not be part of the same structure as that for the subassembly 310. The packaging substrate may comprise ceramic in certain embodiments. Ceramic is a material that can provide desired thermal, electrical, and mechanical properties as a packaging substrate. In one embodiment, other materials having such properties can also be used as a packaging substrate.

The subassembly 310 is configured couple with ferrule assembly 320. In particular, optical fiber ends in the ferrule may be aligned with the transmitter 304 and receiver 306 to provided optical coupling between the fiber ends and the transmitter and receiver.

Figure 10:
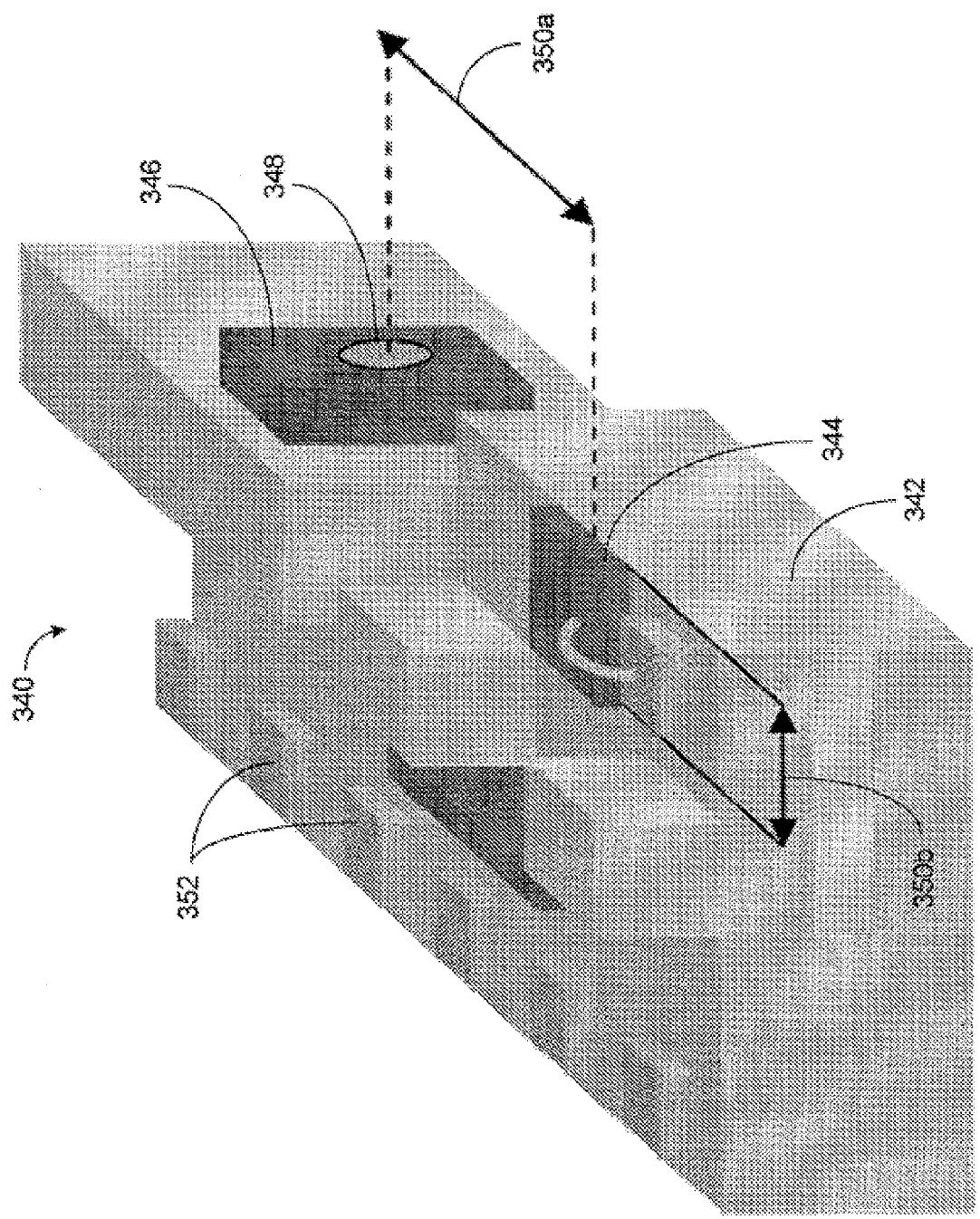
FIG. 10 shows a more detailed view of one embodiment of the submount.

FIG. 10 shows a perspective view of one embodiment of a support assembly 340 that can be the subassembly 310 described above in reference to FIGS. 9A-9D. As previously described, such implementation of a submount can provide various flexibility in manufacturing and/or testing processes.

In one embodiment, the support assembly 340 can include mounting substrate 342 having surfaces for mounting of a laser 344 and a photo-detector 346. The laser 344 is depicted as being an edge-emitting type, and the photo-detector 344 a surface-detecting type (with a detecting surface 348). It will be understood, however, that other combinations of laser and photo-detector are possible. In one embodiment, the support assembly 340 can also be dimensioned to facilitate mounting of a monitor photo-detector (not shown).

The support assembly 340 is also shown to have a plurality of contacts 352 that facilitate electrical connection of the laser 344 and the photo-detector 346 with the die (not shown).

In one embodiment, the laser 344 and the photo-detector 346 can be positioned and oriented relative to each other in a manner similar to those described above in reference to FIGS. 6-9. For example, the distance between the centers of the laser 344 and the photo-diode 346 (arrow 350a) can be approximately 750 µm. In another example, the length of the laser 344 (arrow 350b) can be approximately 250 µm, similar to the example laser described above in reference to FIG. 8B. Other dimensions, however, are possible. For example, in different embodiments, the center-to-center distance may be larger or smaller than 750 microns. In certain embodiments, however, the center-to-center distance is less than 1000 microns.

In one embodiment, the support assembly 340 can be formed from ceramic. In one embodiment, the support assembly 340 can be a monolithic structure that supports both of the laser and photodetector. In one embodiment, the support assembly 340 can include separate first and second subassemblies, with the laser mounted to the first subassembly and the photo-detector mounted to the second subassembly. In one embodiment, the support assembly 340 can comprise insulating material and include conductive pathways therethrough or thereon that provide electrical connections from the laser and the photo-detector to the electronics on the die (not shown). The conductive pathways can lead to the electrical contact 352 to provide electrical connections with the electronics on the die (not shown). In one embodiment, the support assembly 340 is positioned relative to the die so as to butt up against the die. In some embodiments, the electrical contacts 352 mate with other contacts mounted on the die.

Figure 11A:
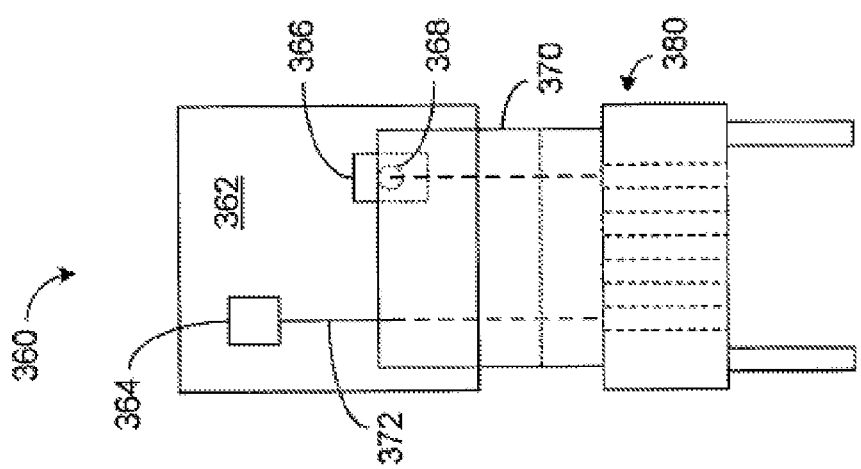
FIGS. 11A-11C show different views of one embodiment of the integrated transceiver, where the surface-detecting photo-diode can be optically coupled with the multi-fiber assembly via an optical coupling element.
Figure 11B:
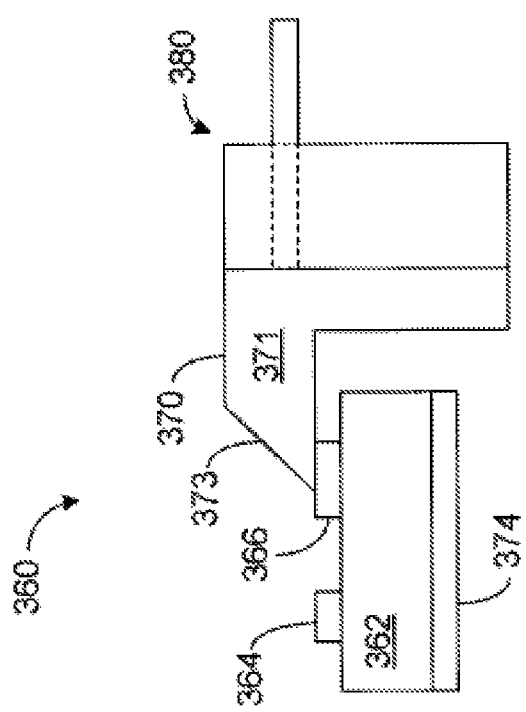
Figure 11C:
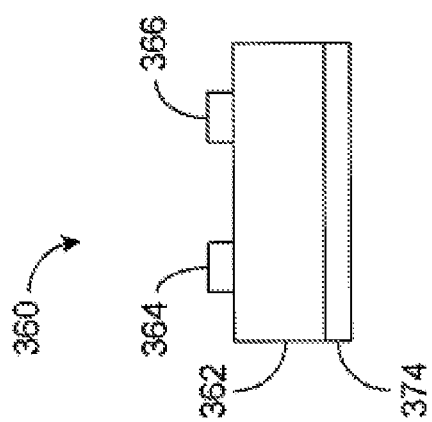
Figure 12A:
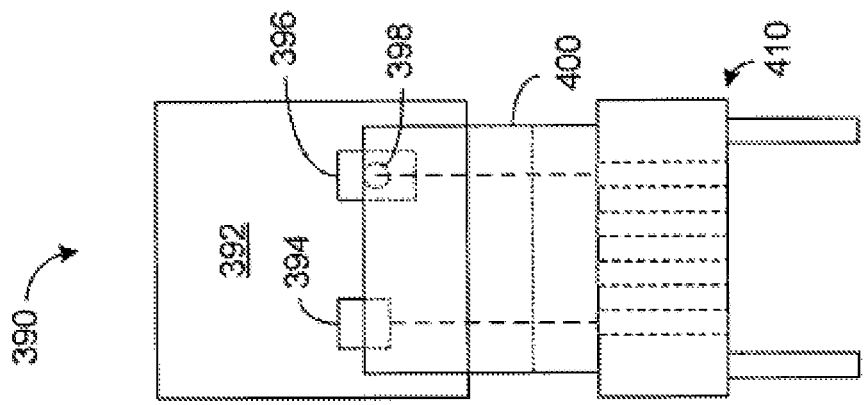
FIGS. 12A-12C show different views of one embodiment of the integrated transceiver, where the surface-detecting photo-diode and the surface-emitting laser-diode can be coupled with the multi-fiber assembly via the optical coupling element.
Figure 12B:
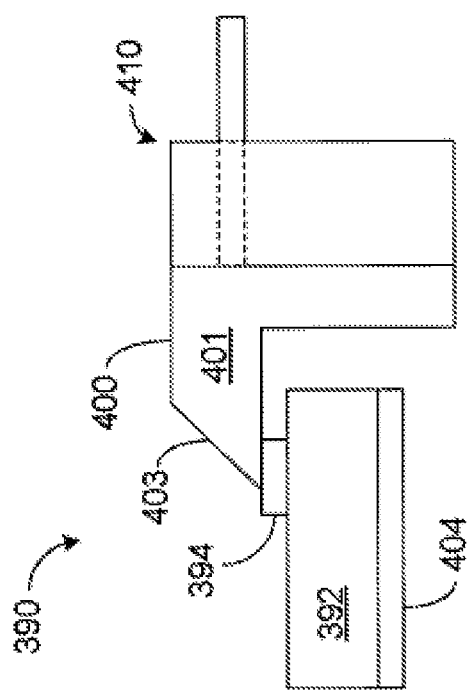
Figure 12C:
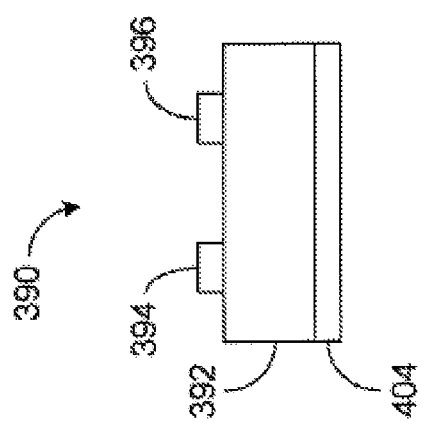
Figure 13A:
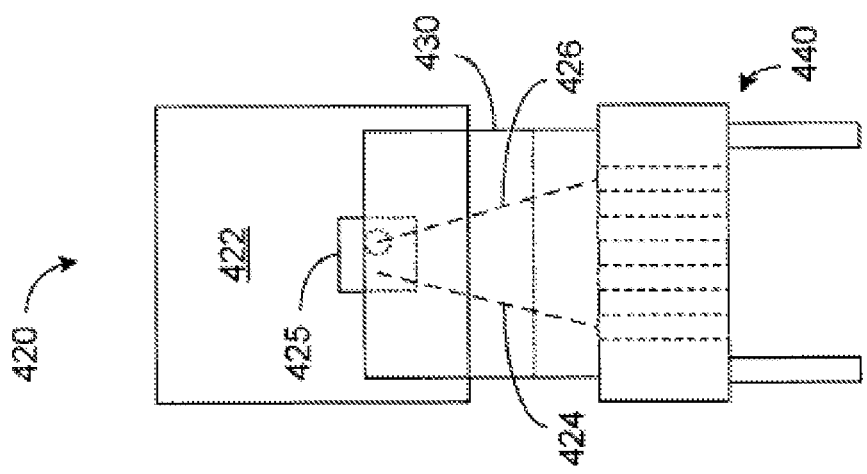
FIGS. 13A-13C show different views of one embodiment of the integrated transceiver, where the emitter and the detector can be integrated into a single chip and be coupled with the multi-fiber assembly via the optical coupling element.
Figure 13B:
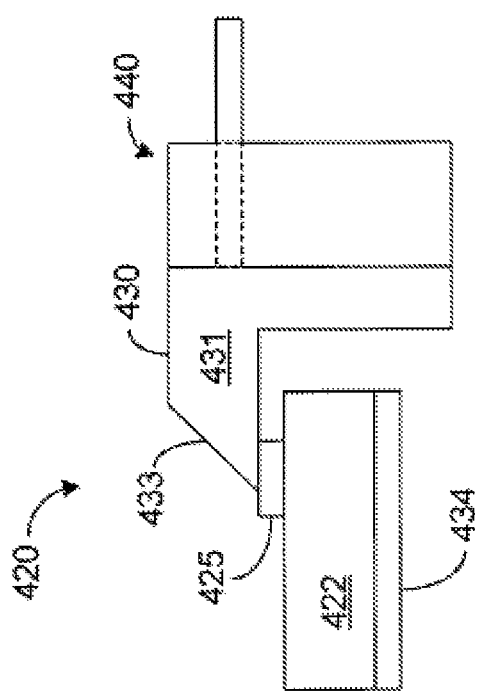
Figure 13C:
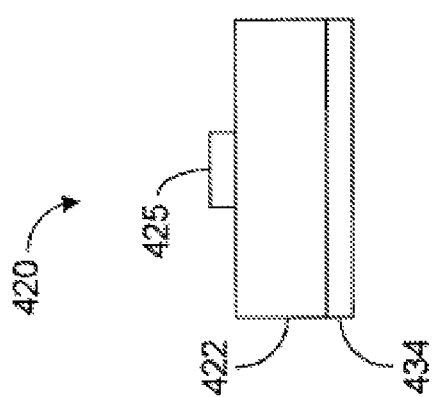

FIGS. 11-13 show various embodiments of optical coupling configurations between an integrated transceiver and a ferrule. In one embodiment 360 shown in FIGS. 11A-11C, an optical coupling element 370 is shown to couple light between an integrated transceiver and a ferrule 380. In one embodiment 390 shown in FIGS. 12A-12C, an optical coupling element 400 is shown to couple light between another integrated transceiver and a ferrule 410. In one embodiment 420 shown in FIGS. 13A-13C, an optical coupling element 430 is shown to couple light between another integrated transceiver and a ferrule 440. For the purpose of description, it will be assumed that the optical coupling elements 370, 400, and 430 are similar; and ferrules 380, 410, and 440 are similar. Moreover, the dies 362, 392, and 422 can be configured similarly in manners described above (including mounting via their respective mounting layers 374, 404, and 434). However, it will be understood that such similarities are not requirements, and that they may be different.

In one embodiment, the optical coupling element can include a light pipe or conduit having a length 371, 401, 431 of substantially optically transmissive material (for example, glass or plastic). The light pipe or light guide can have a first end and a second end, with the second end being disposed proximal to a photo-detector (366, 396, and 425). In some embodiments, this light pipe may guide light from the first end to the second end in part via total internal reflection at the sidewalls. Much of the light may however propagate forward from the first end to the second end without reflecting from the sidewalls. The second end can include a sloping reflective surface 373, 403, 433 angled such that light propagating along the length from the first end to the second end is redirected to the photo-detector. In one embodiment, the sloping reflective surface 373, 403, 433 can be angled such that a difference, between the angle of the sloping reflective surface (373, 403, 433) relative to the length of the light pipe and the incident angle of light with respect to a normal to the sloping reflective surface, is between about 4° and 12°. If the length of the light pipe is horizontal and the detector faces upwards, such an angle (e.g., between about 4° and 12°) represents the incident angle on the detector. In one embodiment, the sloping reflective surface 373, 403, 433 can include a total internal reflection surface. The sidewalls, including the sloping sidewalls can be planar in some embodiments, although the shape should not be so restricted. The sidewalls and in particular the sloping reflective sidewall can be polished in some embodiments to reduce scattering of light undergoing total internal reflection. A reflective coating (e.g., an interference coating or metallization) can be used in some embodiments. Examples of embodiments of optical coupling elements are disclosed in U.S. application Ser. No. 11/109,210 titled "PLC For Connecting Optical Fibers to Optical or Optoelectronic Devices" which is incorporated herein by reference in its entirety.

In one embodiment, the first end of the light pipe can be disposed with respect to a multi-fiber ferrule (such as Mini-MT multi-fiber assembly) to permit light coupling into the light pipe. In one embodiment, the multi-fiber assembly can be positioned so that the optical axes of the fibers therein can be substantially aligned with the optical axis of the light pipe or light guide. In particular, the fibers may be positioned, e.g., centered with respect to the length of transmissive material such that light from the fiber can be coupled into the light pipe and propagate directly to the sloping reflective surface. In some embodiments, an anti-reflection coating or index matching can be provided at the first end to increase coupling efficiency.

In the example embodiments shown in FIGS. 11-13, the photo-detectors 366 (with a detecting surface 368), 396 (with a detecting surface 398), and 425 can be surface-detecting types. The photo-detectors may include planar photo-sensitive surfaces oriented parallel to the surface of the dies 362, 392, 422 on which the photodetectors 366, 396, 425 are mounted. Direct coupling with such surface-detecting photo-detectors with the second end of the light pipe can reduce signal loss. In some embodiments, the bottom surface of the coupler can be disposed with respect to the photo-detector to couple light thereto. In certain embodiments, the bottom surface of the coupler can contact the detector, or be positioned so as to provide a gap between the bottom surface of the coupler and the detector. In certain embodiments, an optically transmissive adhesive, which in some cases may provide index matching, may exist between the bottom surface of the coupler and the detector. The detector may or may not have a glass faceplate in front of the photosensitive surface. In some embodiments, as described below, an intermediate optical component, for example, a spacer, is disposed between the coupler and the photo-detector.

In one embodiment, as shown in FIGS. 11A-11C, a laser 364 can couple light into a waveguide structure 372 having an output disposed with respect to the second end of the light pipe, to thereby couple light into the second end of the light pipe. In one embodiment, the waveguide structure 372 can be a planar waveguide formed on the planar surface of the die 362. In one embodiment, the planar waveguide can comprise an optical modulator. This modulator may comprise a ring resonator or other type of waveguide resonator or modulator such as a Mach-Zehnder modulator. Examples of different embodiments of ring resonators can be found in U.S. Pat. No. 6,895,148 titled "MODULATOR BASED ON TUNABLE RESONANT CAVITY" which is incorporated herein by reference in its entirety. Examples of different embodiments of Mach-Zehnder modulators can be found in U.S. Pat. No. 7,039,258 titled "DISTRIBUTED AMPLIFIER OPTICAL MODULATORS" and U.S. application Ser. No. 11/540,172 titled "DISTRIBUTED AMPLIFIER OPTICAL MODULATORS", which are each incorporated herein by reference in their entirety. Modulation of the light from the laser using a modulator may be more advantageous than modulating the laser. In one embodiment, the waveguide structure can further include an optical waveguide grating coupler to couple light from the planar waveguide to the second end of the light pipe. Examples of embodiments of waveguide grating couplers are disclosed in U.S. application Ser. No. 10/776,475 titled "OPTICAL WAVEGUIDE GRATING COUPLER" which is incorporated herein by reference in its entirety.

In different embodiments, the lateral spacing between the photodetector 366 and the waveguide 372 is about 750 microns. In other embodiments, however, the spacing may be larger or smaller than 750 microns. In certain embodiments, for example, the center-to-center distance is less than 1000 microns. In one embodiment, the center-to-center distance may be less than 750 microns (for example, about 250 microns).

In one embodiment, a substantially optically transmissive spacer can be disposed between the second end of the light pipe and the die so as to couple light output from the waveguide structure into the second end of the light pipe. In one embodiment, the substantially optically transmissive spacer can include silicon having at least one anti-reflection coating thereon. In one embodiment, the spacer can be held in place by an optically transmissive adhesive.

In one embodiment, as shown in FIGS. 12A-12C, a laser 394 can be a surface-emitting laser. The emitting surface of the laser 394 can have an output that faces upwards, e.g., normal to the top surface of the die 392, similar to the upward-facing detecting surface 398 of the photo-detector 396, so as to couple with the second end of the light pipe 400. Accordingly, the output surface of the laser 394 may be parallel to the top surface of the die 392 on which the laser is mounted. In one embodiment, such surface-emitting laser 394 can be a VCSEL (vertical cavity surface emitting laser). In some embodiments, the surface emitting laser comprises a HCSEL (horizontal cavity surface emitting laser). Example lasers 394 comprising a stack of layers of material with an output face on the top of the stack.

In some embodiments the laser 394 and the photo-detector 396 can be separated by 750 microns. In different embodiments, the center-to-center distance may be larger or smaller than 750 microns. In certain embodiments, however, the center-to-center distance is less than 1000 microns. In one embodiment, the center-to-center distance may be less than 750 microns (for example, about 250 microns).

In one embodiment, as shown in FIGS. 13A-13C, a surface-emitting laser and a surface-detecting photo-detector can be monolithically integrated into a single chip unit 425. As with the example configuration of FIGS. 12A-12C, the emitting surface of the laser and the detecting surface of the photo-detector can face upward so as to couple with the second end of the light pipe 430. In one embodiment, the surface-emitting laser can be a VCSEL or a HCSEL.

In one embodiment, the laser can be configured to emit light at approximately 1310 nm, and the photo-detector can be configured to detect light at approximately 1490 nm. In one embodiment, the laser can be modulated at a rate of approximately 2.5 Gbps, and the photo-detector can support data rate at approximately 2.5 Gbps. In one embodiment, such monolithically integrated chip can operate uncooled.

Based on the foregoing, one can see that there can be many possible variations in selection of lasers and photo-detectors, as well as how they are positioned, oriented, integrated, and mounted. For example, as described above with reference to FIGS. 3, 4A-4C, and 5A-5B, use of edge emitting lasers and edge detectors can provide smaller footprints (for example, an edge-emitting laser can be approximately 250 µm×250 µm) to allow implementation of more than one channel for the integrated transceiver. In another example, described above with reference to FIGS. 6A-6D, 7A-7C, and 8A-8B, use of surface-detectors can allow for more relaxed alignment. Surface photodetectors that are commercially available can also be used. Integrating the photodetectors in the die can further reduce package dimensions and cost while improving performance by eliminating external electrical connections.

Aside from size and alignment considerations, optical coupling efficiency can also be considered when selecting a configuration for the integrated transceiver. In general, when being optically coupled with a circular-cross-section waveguide (such as an optical fiber), an optical fiber couples with a lesser efficiency to an edge detector than to a surface-photo-detector which has a larger area for receiving the light from the fiber.

Figure 14A:
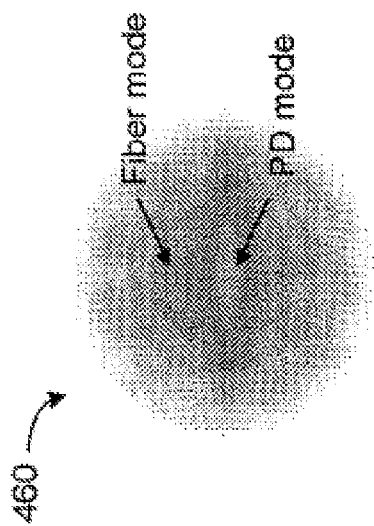
FIGS. 14A and 14B show examples of some design considerations for the example edge-detecting photo-diode.
Figure 14B:
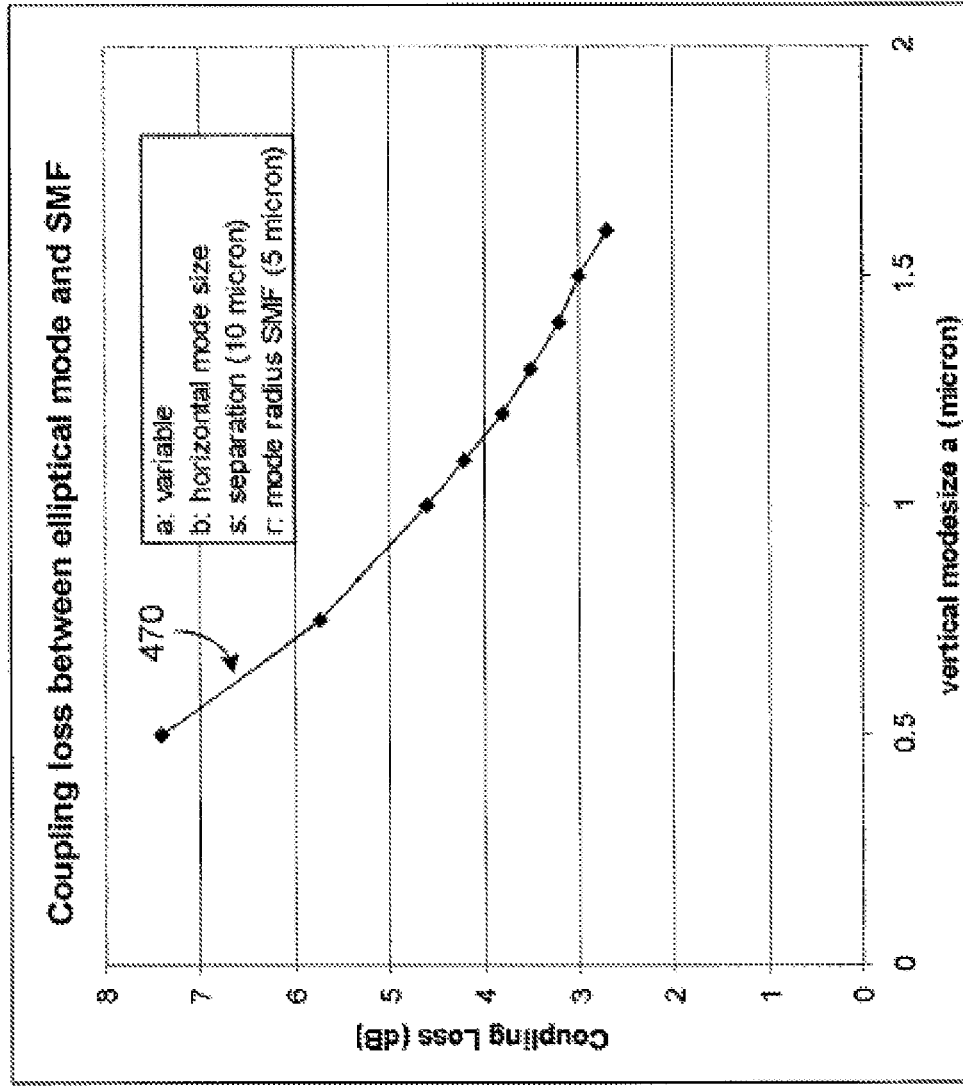

FIG. 14A shows an example optical coupling configuration 460 between an edge-detecting photo-diode (depicted as "PD mode") and a circular fiber (depicted as "Fiber mode"). As shown, portions of the circle above and below the elliptical distribution of the PD mode do not overlap with the detecting region of the PD, thereby reducing the optical coupling efficiency. FIG. 14B shows an exemplary relationship between such coupling loss between an example 5 µm single-mode fiber (SMF) separated from the detecting edge of the PD by about 10 µm. The horizontal mode size of the detecting edge is held at a constant value, and the vertical mode size is varied (X-axis). As shown by line 470, the relationship between coupling loss (Y-axis) and the vertical mode size (X-axis) is generally an inverse relationship. Based on such characterization, one can select a desired operating configuration of an edge-detecting (or edge-emitting) component when being coupled to a fiber.

In some situations, coupling loss associated with edge-emitting lasers and edge detectors may be acceptable. In some situations, such coupling loss with for example an edge detector may not be desirable—in which case, surface photo-detector may be used. In some embodiments, loss and power budget considerations may be used to select a desired configuration of the integrated transceiver.

Many variations in the selections and/or orientations of lasers and/or detectors are possible. For example, a surface emitting laser can be oriented and mounted such that the output surface faces outward (generally orthogonal to the top surface of the die) instead of the example edge-emitting lasers (for example, in FIG. 3).

Various embodiments described herein can provide an integrated transceiver that has a reduced form factor but that provides for high data rates. Various features of the physical, optical, and electrical design may provide these and other advantages. For example, the selection, positioning, orientation, and arrangement of components as described herein may result compactness, ruggedness, efficient optical coupling, high data rates, and ease of manufacture and repair. In some embodiments, the shape of the packaging may be useful in providing a compact and robust platform. Also, various types of electrical connections, which may include for example pins, sockets, wires, traces, conductive pathways imbedded in ridged insulating material, or any combination thereof, may additionally provide for a robust design that is easy to manufacture and that uses largely existing optical and electrical components. Other design features may contribute to the performance and advantages provided by the designs described herein.

A wide variety of variations, however, are possible. For example, additional structural elements may be added, elements may be removed or elements may be arranged or configured differently. Similarly, processing steps may be added, removed, or ordered differently. Accordingly, although the above-disclosed embodiments have shown, described, and pointed out the novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

The invention claimed is:

1. A communication system comprising:
   a transceiver comprising a plurality of CMOS chips, a first of said plurality of CMOS chips comprising optical and optoelectronic devices and at least a second of said plurality of CMOS chips comprising electronic devices;
   wherein a semiconductor laser communicates an optical source signal into said first CMOS chip, said optical source signal for generating first optical signals that are transmitted from said first CMOS chip to optical fibers coupled to said first CMOS chip; and
   wherein second optical signals are received from optical fibers and converted to electrical signals via one or more photodetectors.

2. The communication system according to claim 1, wherein said optical devices comprise waveguides and couplers.

3. The communication system according to claim 1, wherein said optoelectronic devices comprise one or more modulators.

4. The communication system according to claim 1, wherein said one or more photodetectors are integrated in at least one of said plurality of CMOS chips.

5. The communication system according to claim 1, wherein said one or more photodetectors are mounted on at least one of said plurality of CMOS chips.

6. The communication system according to claim 1, wherein said semiconductor laser is mounted on one of said plurality of CMOS chips.

7. The communication system according to claim 1, wherein said transceiver is operable to communicate said optical source signal from said semiconductor laser into said first CMOS chip via one or more optical fibers.

8. The communication system according to claim 1, wherein said transceiver is operable to communicate said optical source signal in to a top surface of said first CMOS chip.

9. The communication system according to claim 1, wherein said transceiver is operable to communicate said first optical signals out of a top surface of said first CMOS chip.

10. The communication system according to claim 1, wherein said transceiver is operable to communicate said electrical signals out of said transceiver.

11. A method for communicating signals, the method comprising:
    in a transceiver comprising a plurality of CMOS chips, a first of said plurality of CMOS chips comprising optical and optoelectronic devices and at least a second of said plurality of CMOS chips comprising electronic devices:
    communicating an optical source signal from a semiconductor laser into said first CMOS chip;
    generating using said optical source signal, first optical signals;
    transmitting said first optical signals from said first CMOS chip to optical fibers coupled to said first CMOS chip;
    receiving second optical signals from optical fibers; and
    converting said second optical signals to electrical signals via one or more photodetectors in said first CMOS chip.

12. The method according to claim 11, wherein said optical devices comprise waveguides and couplers.

13. The method according to claim 11, wherein said optoelectronic devices comprise one or more modulators.

14. The method according to claim 11, wherein said one or more photodetectors are integrated in at least one of said plurality of CMOS chips.

15. The method according to claim 11, wherein said one or more photodetectors are mounted on at least one of said plurality of CMOS chips.

16. The method according to claim 11, wherein said semiconductor laser is mounted on one of said plurality of CMOS chips.

17. The method according to claim 11, comprising communicating said optical source signal from said semiconductor laser into said first CMOS chip via one or more optical fibers.

18. The method according to claim 11, comprising communicating said optical source signal in to a top surface of said first CMOS chip.

19. The method according to claim 11, comprising communicating said first optical signals out of a top surface of said first CMOS chip.

20. The method according to claim 11, comprising communicating said electrical signals out of said transceiver.

21. A communication system comprising:
    a transceiver comprising a plurality of silicon CMOS chips;
    wherein a III-V semiconductor laser communicates an optical source signal into a first CMOS chip of said plurality of silicon CMOS chips, said optical source signal for generating first optical signals that are transmitted from said first CMOS chip to optical fibers coupled to said first CMOS chip; and
    wherein second optical signals are received from optical fibers and converted to electrical signals.

22. The communication system according to claim 21, wherein one or more of said plurality of silicon CMOS chips comprise optical devices, and said optical devices comprise waveguides and couplers.

23. The communication system according to claim 21, wherein one or more of said plurality of silicon CMOS chips comprise optoelectronic devices, and said optoelectronic devices comprise one or more modulators.

24. The communication system according to claim 21, wherein said transceiver is operable to convert said second optical signals to electrical signals via one or more photodetectors.

25. The communication system according to claim 21, wherein said one or more photodetectors are integrated in at least one of said plurality of silicon CMOS chips.

26. The communication system according to claim 24, wherein said one or more photodetectors are mounted on at least one of said plurality of silicon CMOS chips.

27. The communication system according to claim 21, wherein said III-V semiconductor laser is mounted on one of said plurality of silicon CMOS chips.

28. The communication system according to claim 21, wherein said transceiver is operable to communicate said optical source signal from said semiconductor laser into said first CMOS chip via one or more optical fibers.

29. The communication system according to claim 21, wherein said transceiver is operable to communicate said optical source signal in to a top surface of said first CMOS chip.

30. The communication system according to claim 21, wherein said transceiver is operable to communicate said first optical signals out of a top surface of said first CMOS chip.

31. The communication system according to claim 21, wherein said transceiver is operable to communicate said electrical signals out of said transceiver.

32. The communication system according to claim 21, wherein said transceiver is operable to communicate said optical source signal into said first CMOS chip via one or more optical couplers.

33. The communication system according to claim 32, wherein said optical couplers comprise grating couplers.

34. The communication system according to claim 21, wherein said transceiver is operable to transmit said first optical signals from said first CMOS chip via one or more optical couplers.

35. The communication system according to claim 34, wherein said optical couplers comprise grating couplers.

36. A method for communicating signals, the method comprising:
    in a transceiver comprising a plurality of silicon CMOS chips:
        communicating an optical source signal from a III-V semiconductor laser into a first CMOS chip of said plurality of silicon CMOS chips;
        generating using said optical source signal, first optical signals;
        transmitting said first optical signals from said first CMOS chip to optical fibers coupled to said first CMOS chip;
        receiving second optical signals from optical fibers; and
        converting said second optical signals to electrical signals.

37. The method according to claim 36, wherein one or more of said plurality of silicon CMOS chips comprise optical devices, and said optical devices comprise waveguides and couplers.

38. The method according to claim 36, wherein one or more of said plurality of silicon CMOS chips comprise optoelectronic devices, and said optoelectronic devices comprise one or more modulators.

39. The method according to claim 36, wherein said transceiver is operable to convert said second optical signals to electrical signals via one or more photodetectors.

40. The method according to claim 36, wherein said one or more photodetectors are integrated in at least one of said plurality of silicon CMOS chips.

41. The method according to claim 36, wherein said one or more photodetectors are mounted on at least one of said plurality of silicon CMOS chips.

42. The method according to claim 36, wherein said III-V semiconductor laser is mounted on said first CMOS chip.

43. The method according to claim 36, comprising communicating said optical source signal from said III-V semiconductor laser into said first CMOS chip via one or more optical fibers.

44. The method according to claim 36, comprising communicating said optical source signal in to a top surface of said first CMOS chip.

45. The method according to claim 36, comprising communicating said first optical signals out of a top surface of said first CMOS chip.

46. The method according to claim 36, comprising communicating said electrical signals out of said transceiver.

47. The method according to claim 36, comprising communicating said optical source signal into said first CMOS chip via one or more optical couplers.

48. The method according to claim 47, wherein said optical couplers comprise grating couplers.

49. The method according to claim 36, comprising transmitting said first optical signals from said first CMOS chip via one or more optical couplers.

50. The method according to claim 49, wherein said optical couplers comprise grating couplers.

* * * * *